(12) United States Patent
Thompson

(10) Patent No.: US 6,484,365 B1
(45) Date of Patent: Nov. 26, 2002

(54) VISOR CLIP AND METHOD THEREFORE

(76) Inventor: Jeffrey S. Thompson, 13308 Shahan Dr., Dallas, TX (US) 75234

( * ) Notice: Subject to any disclaimer, the term of this patent is extended or adjusted under 35 U.S.C. 154(b) by 0 days.

(21) Appl. No.: 09/476,970

(22) Filed: Dec. 31, 1999

(51) Int. Cl.[7] .............................. A47B 1/10; A44B 21/00
(52) U.S. Cl. ........................ 24/3.12; 24/546; 224/312; 248/231.81
(58) Field of Search .......................... 24/3.1, 3.2, 3.11, 24/3.12, 3.13, 336, 339, 3.8, 3.3; 296/97.6, 97.2; 224/312, 242; 206/380; 248/231.81

(56) References Cited

U.S. PATENT DOCUMENTS

| 845,743 | A | | 3/1907 | Bindner | |
|---|---|---|---|---|---|
| 881,757 | A | | 3/1908 | Winsor | |
| 1,730,959 | A | | 10/1929 | Warfield | |
| 2,306,174 | A | * | 12/1942 | Mallory | 248/229.26 |
| D156,659 | S | | 12/1949 | Reed | |
| 2,618,086 | A | | 11/1952 | Komorous | |
| 3,204,762 | A | | 9/1965 | Shanok et al. | |
| 3,279,009 | A | | 10/1966 | Deane | |
| 3,983,602 | A | * | 10/1976 | Barry | 24/339 X |
| 4,269,313 | A | | 5/1981 | Smith | |
| 4,285,554 | A | * | 8/1981 | Bell et al. | 224/312 |
| 4,637,512 | A | | 1/1987 | Smith | |
| 5,065,970 | A | * | 11/1991 | Gross | 248/316.7 X |
| 5,184,375 | A | * | 2/1993 | Hoyt | 24/3.12 |
| 5,238,163 | A | | 8/1993 | Leach et al. | |
| 5,330,085 | A | | 7/1994 | Horensky et al. | |
| 5,340,071 | A | * | 8/1994 | Fox, III | 248/231.8 |
| 5,463,189 | A | * | 10/1995 | Deneke et al. | 24/336 X |
| 5,489,078 | A | | 2/1996 | Risley | |
| 5,619,774 | A | * | 4/1997 | Perry | 24/3.12 X |
| 5,829,103 | A | | 11/1998 | Allen | |

* cited by examiner

Primary Examiner—Robert J. Sandy

(57) ABSTRACT

A visor clip of unitary construction is presented along with a method for manufacture. The visor clip includes an engagement portion that frictionally engages with an engagement target, which may be a sun visor in an automobile. A payload portion is designed to receive and frictionally couple to a payload, where the payload may include a number of small objects such as toothpicks. The payload portion includes a number of extended portions on one or more of the surfaces that define the payload portion. The inclusion of the extended portions provides a number of force application points that enhance the frictional engagement of the payload.

18 Claims, 4 Drawing Sheets

VISOR CLIP AND METHOD THEREFORE

FIELD OF THE INVENTION

The invention relates generally to a clip and more particularly to a clip that attaches to a sun visor.

BACKGROUND OF THE INVENTION

A number of visor clips exist in the art for holding specific items to the visor of an automobile. Many of these clips are complex and include a number of separate components fitted together. Such designs are costly to produce. Other designs exist that are simple in construction, but inadequate for holding specific types of payload.

One prior art visor clip is detailed in U.S. Pat. No. 5,489,078 issued to Risley (hereinafter "Risley"). The Risley clip is specifically designed for holding a container of moist snuff. Although the Risley design is a one-piece clip, it relies on cantilever force applied to a small portion of the base of the snuff container to provide the required friction against another surface that holds the snuff container in place. As such, the clip as disclosed by Risley only provides force application to the container at a single force application area. Although this may be adequate for supporting a single large object such as a snuff container, the clip as disclosed by Risley is inadequate for holding a number of small objects that may vary slightly in size. For example, the clip as disclosed by Risley does not adequately hold a number of toothpicks.

Other prior art clips exist that are specifically designed for holding a large number of small objects such as toothpicks. One such prior art clip is disclosed in U.S. Pat. No. 5,238,163 issued to Leach et al. (hereinafter "Leach"). Leach describes a visor clip specifically designed for holding toothpicks. The design as disclosed by Leach includes a box-like structure attached to a clip where the box-like structure includes a cover with a slit for insertion of the toothpicks. Although the design of Leach is adequate for holding toothpicks to a visor, it suffers from the disadvantage of being a multi-piece unit. The cover, or cap, of the box-like structure of Leach is described as being manufactured of a different material than the box itself and the clip that holds the assembly to the visor. As such, the manufacturing costs associated with producing the toothpick clip as taught by Leach are undesirable. In addition, the toothpicks inserted into the toothpick holder as described by Leach are only frictionally engaged at a single point within the toothpick holder (the slit of the cover), thus reducing the stability with which the toothpicks are engaged. Furthermore, the toothpick holder as described by Leach is only suitable for holding objects that fit within the narrow slot of the cover. Therefore, the usefulness of the clip as described by Leach is very restrictive.

Therefore, a need exists for a clip that is capable of engaging a large number of small objects such as toothpicks in a stable manner while providing the flexibility to be able to engage other types of payload as well.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF A PREFERRED EMBODIMENT OF THE INVENTION

Generally, the present invention provides a visor clip and method for manufacture for such a visor clip. The visor clip as described herein includes an engagement portion that frictionally engages with an engagement target, which may be a sun visor in an automobile. A payload portion is designed to receive and frictionally couple to a payload, where the payload may include a number of small objects such as toothpicks. The payload portion includes a number of extended portions on one or more of the surfaces that define the payload portion. The inclusion of the extended portions provides a number of force application points that enhance the frictional engagement of the payload. The clip described herein is of unitary construction, thus simplifying manufacturing of the clip and limiting the cost of such manufacture.

Figure 1:
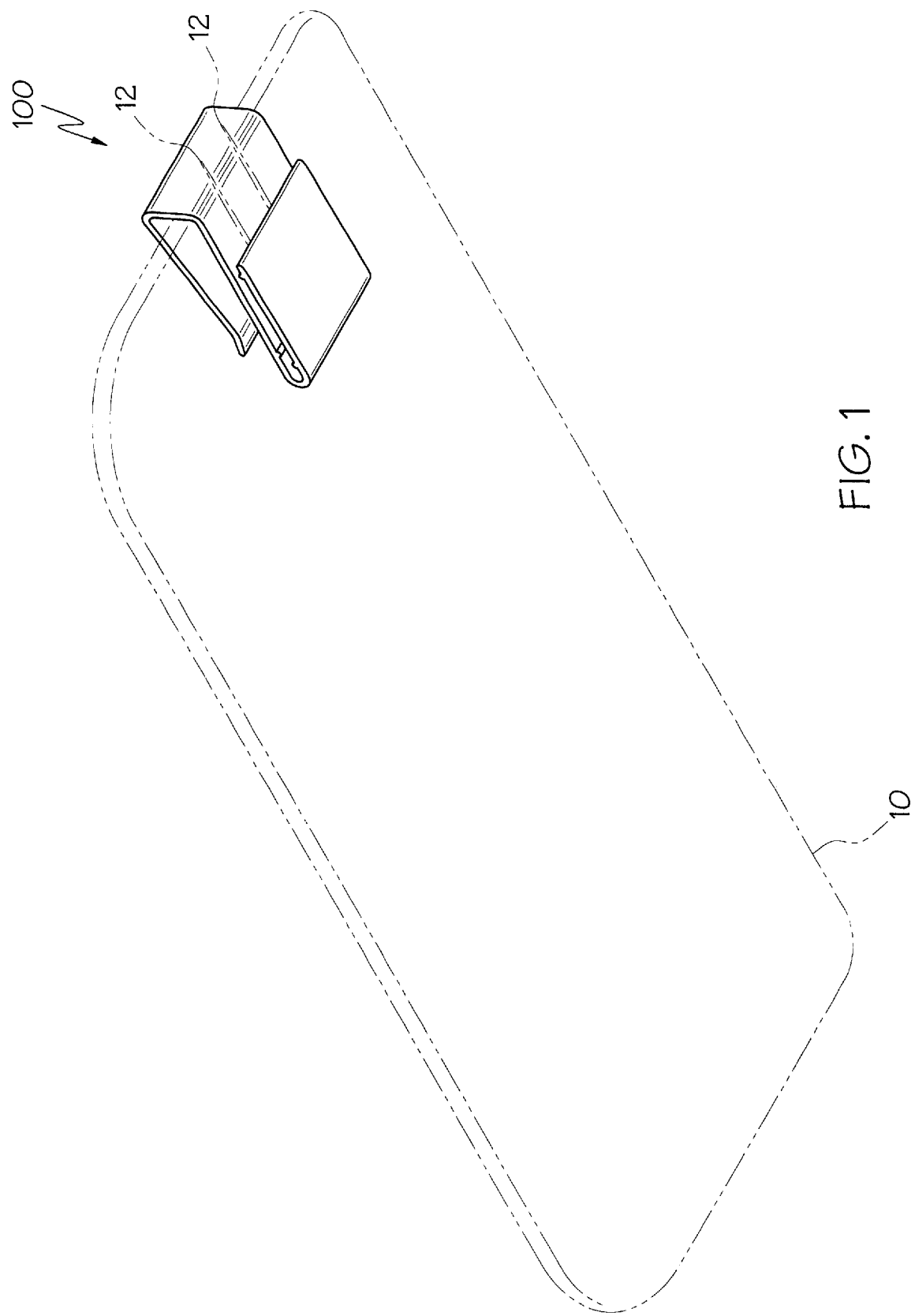
FIG. 1 illustrates a visor clip in accordance with a particular embodiment of the present invention coupled to a sun visor.

The invention can be better understood with reference to FIGS. 1–7. FIG. 1 illustrates a clip 100 as it may be mounted on a visor 10. Although the particular embodiments illustrated in FIGS. 1–7 are described as being mountable on a sun visor within an automobile, it should be apparent to one of ordinary skill in the art that the clip may be useful in a number of different environments and should not be limited to attachment to a sun visor. The clip 100 of FIG. 1 is shown to be holding toothpicks 12. Note that when mounted on a sun visor 10, the clip 100 provides the toothpicks 12 in an accessible manner to a driver or passenger in the vehicle. As is illustrated, a significant portion of the toothpicks 12 are both visible and graspable, which can help a driver to obtain a toothpick without the need for undue attention which is better applied to operating the motor vehicle.

Figure 2:
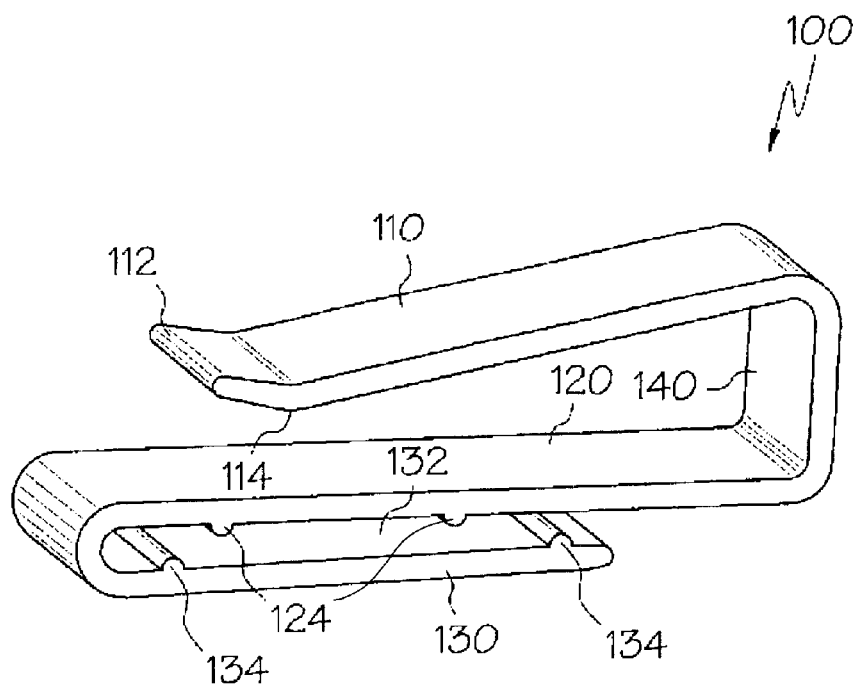
FIG. 2 illustrates a perspective view of a visor clip in accordance with a particular embodiment of the present invention.

A perspective view of one embodiment of a clip in accordance with the teachings herein is illustrated in FIG. 2. The clip 100 of FIG. 2 includes an engagement portion and a payload portion. The engagement portion is the portion of the clip that engages an engagement target, such as the visor of a motor vehicle. The engagement portion of the clip 100 is defined by a first member 110 and a second member 120. The first and second members are flexibly coupled in opposing positions such that a recessed region is formed between the first and second members 110 and 120. The recessed region is adapted to receive the engagement target for frictional coupling.

The frictional coupling of the engagement portion of the clip 100 results from a resilient force that is generated in a direction that is generally normal to the direction of insertion of the engagement target. For the clip 100 of FIG. 2, the normal force will be generally concentrated proximate to the attachment area 114. The angle of the first member 110 with respect to the second member 120 and the spacing between the members 110 and 120 may be varied in order to adjust the amount of force applied by the first member 110 to engage the clip 100 to the engagement target.

The first member 110 is flexibly coupled to the second member 120 via an intermediate portion 140. The intermediate portion 140 also serves as a stop such that when the clip is mounted onto an engagement target such as a visor, the intermediate portion 140 controls how far onto the engagement target the clip is mounted. The first member 110 may include an angled portion 112 that facilitates insertion of the engagement target into the recessed area formed between the first and second members 110 and 120. The angled portion 112 ensures that the first member 110 slides onto the back of a sun visor or similar engagement target smoothly.

The flexible coupling between the first member 110 and the second member 120 via the intermediate portion 140 allows the first member 110 to flex away from the second member 120 during insertion of the engagement target. The displacement of the first member 110 from a resting position by insertion of the engagement target into the first recessed area results in the resilient force directed toward the second member 120. In one embodiment, the material used to manufacture the clip 100 exhibits flexible properties that allow the first member to be displaced without damage or permanent alteration of the general form of the clip 100. However, the flexibility of the material is limited such that the resilience of the material is adequate to support frictional coupling to the engagement target. The specific materials with which the clip is preferably formed are described in additional detail below.

In one embodiment, the recessed area formed between the first member 110 and the second member 120 is sized to allow for the engagement portion to frictionally couple to a sun visor. As is apparent to one of ordinary skill in the art, the dimensions of the different members of the engagement portion may be modified such that the engagement portion is suitable for mounting to other engagement targets having larger or smaller dimensions. Similarly, the general shape of the engagement portion may be altered to include multiple force application areas such as the force application area 114 in order to facilitate coupling to an engagement target having a varied topography.

The payload portion of the clip 100 lies on the opposite side of the second member 120 with respect to the side that partially defines the recessed region of the engagement portion. The payload portion includes a third member 130 that is flexibly coupled to the second member 120 such that the third member opposes the second member in a manner that forms another recessed region. The second member 120 and the third member 130 may be positioned such that they are generally parallel in alignment with respect to each other and a direction of insertion of the payload. The second member 120, which may be generally planar, is shown to have a first surface that is included in the recessed region of the engagement portion and a second surface that is opposite the first surface. The second surface of the second member 120 defines a portion of the recessed region of the payload portion.

The third member 130 also includes a first surface 132 and a second surface. The first surface 132 lies opposite the second surface of the second member 120 and these two surfaces generally define the recessed region of the payload portion. The recessed region formed between the second surface of the second member 120 and the first surface 132 of the third member 130 is adapted to receive payload such that the payload is frictionally engaged in a non-cantilevered manner. Thus, the payload is engaged between the second and third members 120 and 130 in a manner that distributes the force along both sides of the payload.

Figure 3:
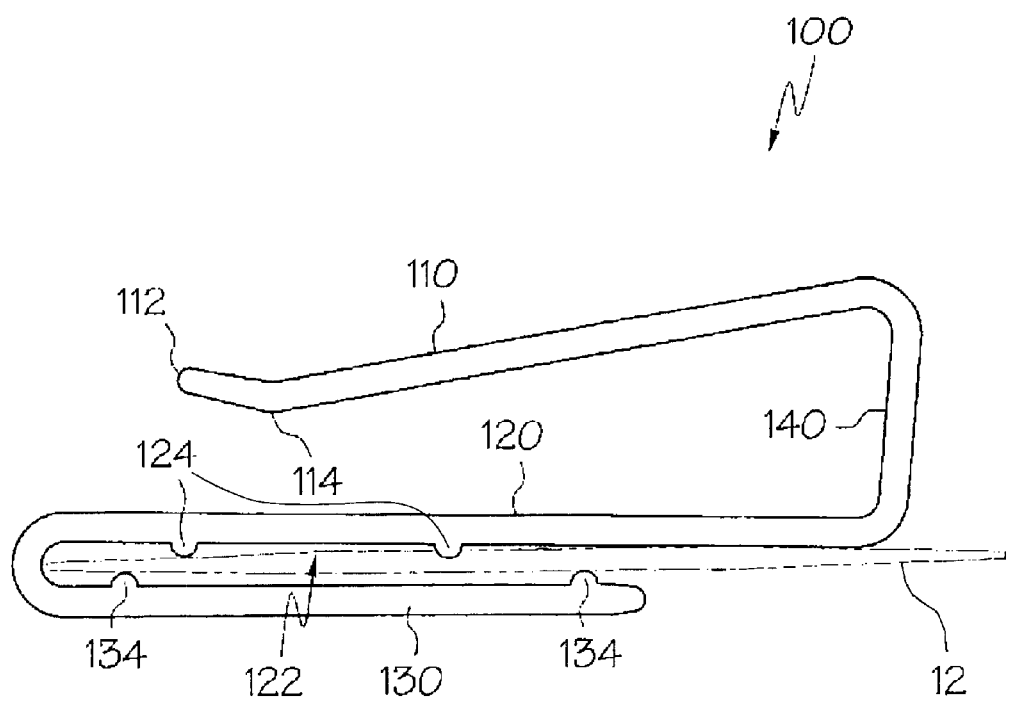
FIG. 3 illustrates a side view of the visor clip of FIG. 2.

FIG. 3 illustrates the frictional coupling of a toothpick 12 in a non-cantilevered manner. The frictional coupling of the toothpick 12 is enhanced through the use of extended portions 134 on the first surface 132 of the third member 130. The extended portions 134 extend outward from the first surface 132 and thus are more proximate to the second surface of the second member than the remaining portion of the first surface 132 of the third member 130. The plurality of extended portions 134 provides a plurality of force application points such that the frictional coupling of the payload is enhanced. As is illustrated in FIG. 3, force is applied to the toothpick by both of the extended portions 134, where one of the extended portions 134 is positioned distant from the point of insertion and the other is positioned proximate to the point of insertion.

As can be seen in FIG. 2, the extended portions 134 extend across the first surface 132 of the third member 130 in a direction that is generally normal to the direction of insertion of the payload. In the embodiment illustrated in FIGS. 2 and 3, the extended portions are transverse ridges, or bump-like structures that extend across the first surface 132 of the third member 130. The embodiments illustrated in FIGS. 4–7 illustrate alternate types of extended portions that facilitate the frictional coupling of the payload in a non-cantilevered manner. These embodiments will be discussed in additional detail below.

In order to further enhance the frictional coupling of the payload, the second surface of the second member 120 may also include one or more extended portions 124 which extend outward and are more proximate to the first surface 132 of the third member 130 than the remaining portion of the second surface of the second member 120. As was the case with the extended portions of the first surface 132 of the third member 130, the extended portions 124 of the second surface of the second member 120 preferably extend across the surface in a direction generally normal to the direction of insertion of the payload and parallel to the direction of any extended portions on the first surface 132 of the third member 130.

As can be seen in the illustration of FIG. 3, the combination of extended portions 124 and 134 provide multiple force application points with respect to the payload. This results in a firm, stable coupling of the payload, and also permits the payload portion to engage a number of small objects simultaneously, such as a group of toothpicks. In addition, the payload portion as illustrated is also suitable for accepting a card, such as a scan card used for a parking garage, as payload. The multiple force application points promote stable coupling of such scan cards, and the lack of sides on the payload portion permit oversized objects to be engaged as payload. Such oversized objects may have a width that is greater than the general width of each of the second and third members 120 and 130.

Figure 4:
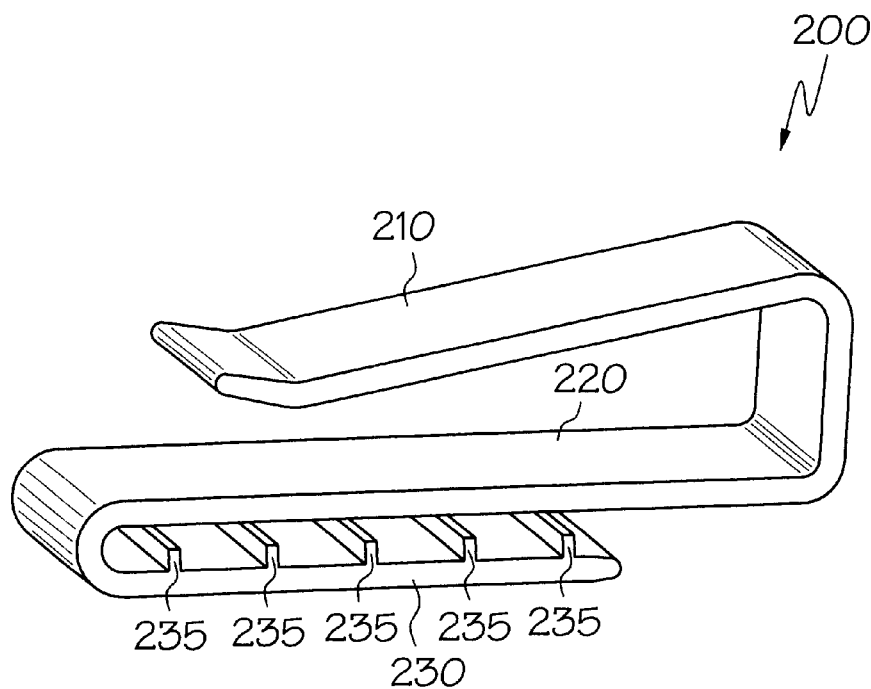
FIG. 4 illustrates a perspective view of a visor clip in accordance with an alternate embodiment of the present invention.
Figure 5:
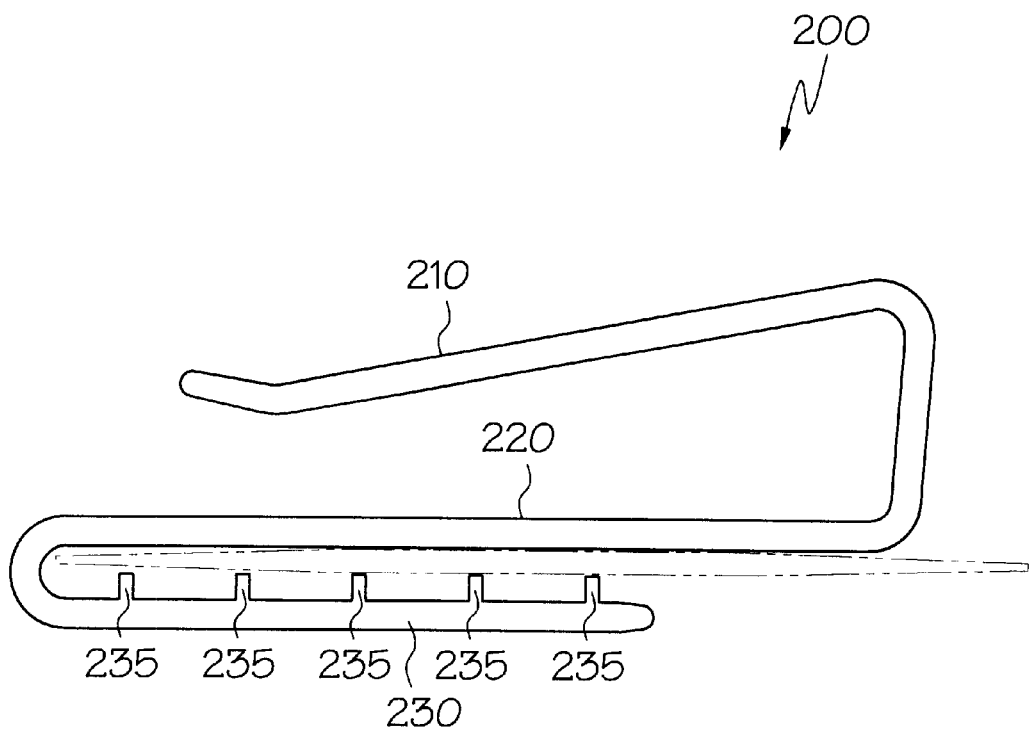
FIG. 5 illustrates a side view of the visor clip of FIG. 4.

The payload portion, as partially defined by an inner surface of the second member 120 and an inner surface of the third member 130, may be formed in other configurations than that illustrated in FIGS. 2 and 3. FIGS. 4 and 5 illustrate clip 200 as one such alternative embodiment. The clip 200 is substantially similar to the clip 100 illustrated in FIGS. 2 and 3. The clip 200 includes a first member 210 and a second member 220 that define a recessed area for engaging the engagement target. A third member 230, which is positioned opposite the second member 220 defines another recessed portion for engagement of the payload. In the embodiment illustrated in FIGS. 4 and 5, the extended portions 235 which are shown to lie along the inner surface of the third member 230 are fins which are generally thinner and more flexible than the transverse ridges, or bumps, 134 and 124 illustrated in FIGS. 2 and 3.

In order to make the fins 235 more flexible, the clip as illustrated in FIGS. 2 and 3 may be made using a co-extrusion process. The co-extrusion processes combines two plastics during extrusion, where one of the plastics may exhibit more rigidity and the other plastic may possess more flexibility. Therefore, co-extrusion could be used to form the fins 235 of a more flexible plastic than that used to form the remainder of the clip 200.

As is shown in FIGS. 4 and 5, the fins 235 provide a plurality of force application points such that payload objects of different configurations are frictionally engaged by one or more of the plurality of fins. In another embodiment of the invention, the fins are placed on the inner surface of the second member 220, which lies opposite the third member 230. Although the fins aid in the frictional coupling of the payload regardless of which surface they are positioned upon, positioning on the third member 230 may improve the ease with which the payload can be inserted into the recessed portion of the to payload portion.

Figure 6:
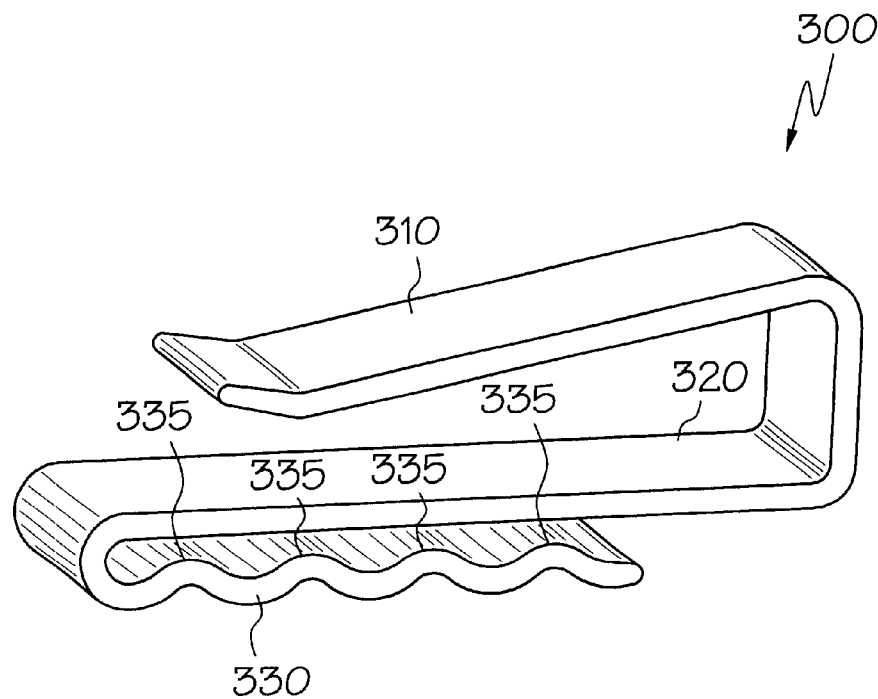
FIG. 6 illustrates a perspective view of a visor clip in accordance with yet another embodiment of the present invention.
Figure 7:
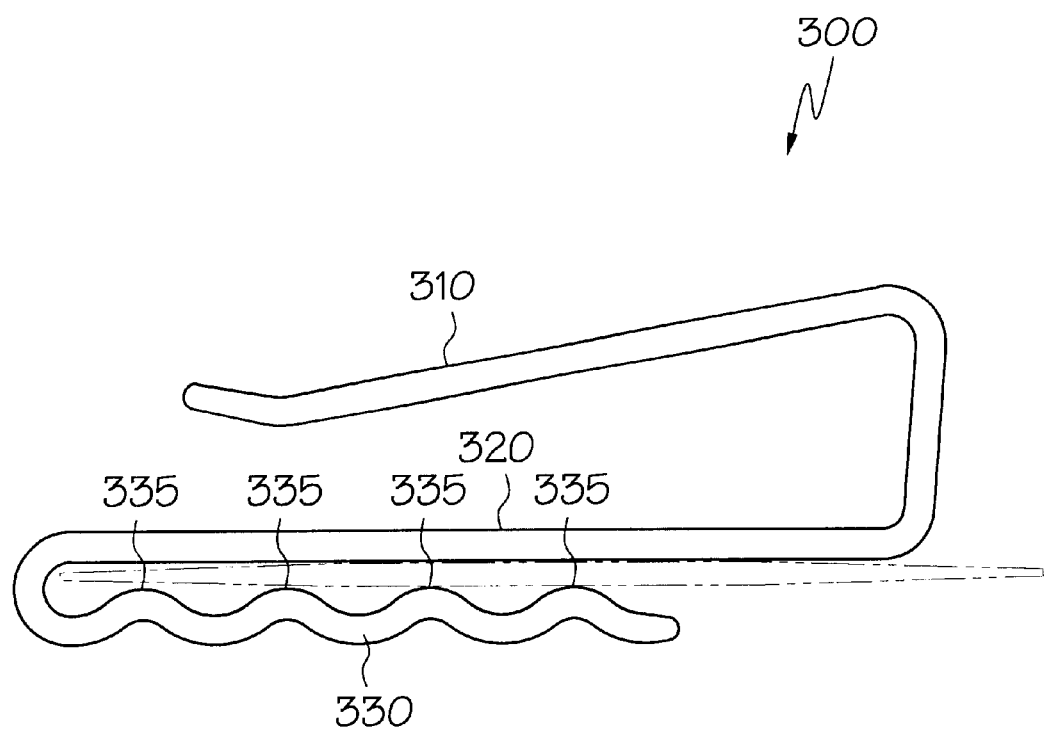
FIG. 7 illustrates a side view of the visor clip of FIG. 6.

FIGS. 6 and 7 illustrate yet another embodiment of the invention in which the clip 300 includes a third member 330 that is non-planar. The clip 300 includes first and second members 310 and 320 that are substantially similar to first and second members 110 and 120 of FIGS. 2 and 3. First and second members 310 and 320 define the engagement portion for coupling to the engagement target.

The payload portion of the clip 300 is different from the payload portions of the clips 100 and 200 in that the third member 330 is non-planar. The non-planar third member 330 is shown to include a number of curves that achieve the same objective as the fins 235 and the clip 200 and the transverse ridges 124 and 134 of the clip 100. Portions of the curves on the non-planar third member 330 are positioned more proximate to the second member 320 than other portions of the non-plainer surface 330. These extended portions 335 provide a plurality of force application points such that the frictional engagement of the payload is facilitated.

In order to allow the clips of FIGS. 2–7 for promotional purposes or to allow them to be decorated with one or more designs, the third member of each of the embodiments may be adapted to facilitate the application of printing to the surface opposite the recessed area adapted for receiving the payload. If the clip is used for attachment to a sun visor in a vehicle, this surface would be visible to the passengers in the vehicle. In the clip 300 of FIGS. 6 and 7, the curved surfaces 335 may be present on the surface within the recessed area of the payload portion, whereas the opposite surface of the third member may be formed to be more planar, thus enabling printing to be applied to the planar surface. Printing may be applied through screen printing or through other printing means understood in the art.

In order to manufacture the clips illustrated in FIGS. 1–7, a casting die, or mold, is formed. The casting die determines the various characteristics of the visor clip being manufactured, and therefore the die must be formed in a manner such that the desirable characteristics for the visor clip as described with respect to FIGS. 1–7 are achieved.

The casting die is formed such that the visor clip includes an engagement portion that is adapted to couple the visor clip to a visor through resilient force resulting from displacement of a first member from a resting position by insertion of the visor into a first recessed area formed between the first member and a second member. The die is also formed in a manner such that the visor clip includes a payload portion. The payload portion includes a third member formed generally parallel to the second member on an opposite side of the second member from the first member. The third member and the second member are flexibly coupled to form a recessed area between an inner surface of the second member and an inner surface of the third member. The recessed area formed between the second and third members includes extended portions on at least one of the inner surfaces to facilitate frictional coupling of payload inserted into the recessed area.

Once the casting die has been formed for the visor clip, at least one plastic material is forced into the die to form the visor clip. The visor clip can then be removed from the die for use. Manufacturing the clips as unitary pieces of material ensures that the clips can be mass produced in a cost-effective manner. Such cost efficient production can be combined with the ability to add a logo or other type of printing to one or more surfaces of the clip to make the clips useful for promotional distribution.

Various types of plastic materials may be suitable for manufacturing the visor clip. Preferably, the plastic material utilized is somewhat heat resistant such that the visor clip will not become deformed while mounted to a sun visor in a motor vehicle. Additionally, the plastic material must be flexible enough to allow for the displacement of the various portions of the clip to enable insertion of both the engagement target and the payload. However, the flexibility must be matched by a level of resilience that ensures adequate force is applied to facilitate the frictional couplings associated with the visor clip.

Some example plastics that may be used include acrylic, polyurethane, styrene, and vinyl. A particular acrylic that exhibits desirable properties for manufacture of the clips is Plexigias DR 101 Acrylic. As is apparent to one of ordinary skill in the art, materials other than plastics may be suitable for the manufacture of such clips, and the particular material may be chosen to suit the environment in which the clip will be used.

The step of forcing plastic material into the die to form the visor clip may be performed using a standard extrusion process. In such an extrusion process lengths of plastic may be extruded through the casting die, where the lengths are typically much longer than the width of a single clip. These plastic lengths can then be cut into a plurality of sections, where each section is a single clip. The length of each section is the width of the corresponding clip, where the width is a measurement across the clip in the same direction in which the fins 235 and the extended portions 124 and 134 of the clips 100 and 200 lie. Because different payloads may be more effectively engaged using clips of different widths, an extruded length of plastic could be cut into a variety of lengths to provide a number of different clip widths. The extrusion and cutting of the clips in this manner is a very cost-effective means for producing the clips. Prior art clips that include multiple portions or more complex designs cannot be produced in such a simple and inexpensive manner.

In other embodiments, a co-extrusion process that includes forcing a first and second plastic material into the die may be employed. Extrusion and co-extrusion of plastics into a casting die are processes that are generally known in the art. By utilizing the co-extrusion process, a first plastic material that exhibits desirable flexibility characteristics can be co-extruded along with a second plastic material that exhibits desirable rigidity in order to form a visor clip with the overall material characteristics desired. The co-extrusion could be used to produce lengths of plastic which are then cut to form the clips as described above with respect to a standard extrusion process.

In other embodiments, forcing the plastic material into the die to form the visor clip may be accomplished through injection molding. Injection molding processes are also generally known in the art. When injection molding is used, the clips may be individually formed such that no additional cutting steps are required.

In yet other embodiments, the clips may be initially formed without the inclusion of the extended portions in the payload portion. A thin foam material, such as a reticulated foam, with an adhesive backing could then be inserted into the recessed area in which the payload is engaged. The adhesive backing adheres the thin foam layer to one of the surfaces within the recessed area. In operation, the foam layer enhances the frictional coupling of the payload in a similar manner as the fins or other extended portions. Preferably, a long sheet of the foam material could be inserted prior to cutting into sections when an extrusion process is used to manufacture the clips. As is apparent to one of ordinary skill in the art, additional materials could be inserted into the recessed area in which the payload is engaged in order to enhance the frictional engagement.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A clip, comprising:
   an engagement portion includes a first member and a second member, wherein the first and second members are flexibly coupled in opposing positions with the first member at an angle with respect to the second member such that a first recessed region is formed between the first and second members, wherein the first recessed region is adapted to receive an engagement target for frictional coupling; and
   a payload portion that includes a third member flexibly coupled to the second member such that the third member opposes the second member in a manner that forms a second recessed region, wherein the second recessed region is adapted to receive payload such that the payload is frictionally engaged in a non-cantilevered manner, wherein the second recessed region comprises an extended portion formed of a first plastic material and wherein the engagement portion and the payload portion are formed of a second plastic material such that the first plastic material is more flexible than the second plastic material.

2. The clip of claim 1, wherein the first and second members are flexibly coupled such that the first recessed region is at least partially expansive upon insertion of an engagement target into the first recessed region, and such that upon insertion, resilient force generally normal to direction of insertion of the engagement target frictionally couples the engagement portion to the engagement target.

3. The clip of claim 1, wherein the first recessed region is adapted to frictionally couple to a sun visor.

4. The clip of claim 1, wherein the third member has first surface and a second surface and wherein the second member has a first surface and a second surface, wherein the first surface of the third member is positioned opposite the second surface of the second member such that the second recessed region is partially defined by the first surface of the third member and the second surface of the second member, wherein the first surface of the third member and the second surface of the second member are generally parallel in alignment with respect to each other and a direction of insertion of the payload.

5. The clip of claim 4, wherein a plurality of extended portions of the first surface of the third member are more proximate to the second surface of the second member than a remaining portion of the first surface of the third member, wherein the plurality of extended portions of the first surface of the third member enhance frictional coupling of the payload by providing a plurality of force application points, wherein the plurality of extended portions extend across the first surface of the third member in a direction generally normal to the direction of insertion of the payload.

6. The clip of claim 5 wherein the extended portions are fins formed on the first surface of the third member.

7. The clip of claim 5 wherein the third member is a non-planar member that includes a plurality of curves.

8. The clip of claim 5, wherein the extended portions are transverse ridges that extend across the first surface of the third member.

9. The clip of claim 8, wherein at least one transverse ridge is formed on the second surface of the second member, wherein the at least one transverse ridge extends across the second surface in a direction generally normal to the direction of insertion of the payload.

10. The clip of claim 4, wherein a plurality of extended portions of the second surface of the second member are more proximate to the first surface of the third member than a remaining portion of the second surface of the second member, wherein the plurality of extended portions of the second surface of the second member enhance frictional coupling of the payload by providing a plurality of force application points.

11. A visor clip of unitary construction, comprising:
   an engagement portion that adapted to couple the visor clip to a visor through resilient force resulting from displacement of a first member from a resting position by insertion of the visor into a first recessed area formed between the first member and a second member, wherein the first and second members are flexibly coupled with the first member at an angle with respect to the second member; and a payload portion that includes a third member formed generally parallel to the second member on an opposite side of the second member from the first member, wherein the third member and the second member are flexibly coupled to form a second recessed area between an inner surface of the second member and an inner surface of the third member, wherein the second recessed area includes extended portions on at least one of the inner surfaces of the second and third members to facilitate frictional coupling of payload inserted into the second recessed area, wherein the extended portions are formed of a first plastic material more flexible than a second plastic material of which the engagement portion is formed.

12. The visor clip of claim 11, wherein the second recessed area is formed to accommodate a plurality of toothpicks as the payload.

13. The visor clip of claim 11, wherein the second recessed area is formed to accommodate a scan card as the payload.

14. The visor clip of claim 11, wherein the visor clip is unitarily constructed of plastic.

15. The visor claim of claim 14, wherein the plastic is acrylic.

16. The visor clip of claim 11, wherein the extended portions are transverse ridges on the third member that extend across the inner surface of the third member generally normal to a direction of insertion of the payload.

17. The clip of claim 16, wherein the extended portions further comprise transverse ridges on the inner surface of the second member generally parallel to the transverse ridges on the inner surface of the third member.

18. The visor clip of claim 11, wherein the extended portions further comprise fins that extend across the inner surface of the third member normal to a direction of insertion of the payload.

* * * * *